United States Patent
Shulman et al.

(10) Patent No.: US 10,885,675 B1
(45) Date of Patent: Jan. 5, 2021

(54) ANALYSIS OF BIOLOGY BY MEASUREMENT OF RELATIVE WIDE SPECTRAL BANDS OF REFLECTED LIGHT AND FLUORESCE LIGHT

(71) Applicants: Alan Shulman, Santa Rosa, CA (US); Miles Scott, Santa Rosa, CA (US)

(72) Inventors: Alan Shulman, Santa Rosa, CA (US); Miles Scott, Santa Rosa, CA (US)

( * ) Notice: Subject to any disclaimer, the term of this patent is extended or adjusted under 35 U.S.C. 154(b) by 119 days.

(21) Appl. No.: 14/563,965

(22) Filed: Dec. 8, 2014

Related U.S. Application Data

(63) Continuation-in-part of application No. 14/135,363, filed on Dec. 19, 2013, now abandoned.

(60) Provisional application No. 61/739,357, filed on Dec. 19, 2012.

(51) Int. Cl.
*H04N 9/47* (2006.01)
*G06T 11/00* (2006.01)
*G06T 7/40* (2017.01)
*G06T 7/00* (2017.01)

(52) U.S. Cl.
CPC .......... *G06T 11/001* (2013.01); *G06T 7/0004* (2013.01); *G06T 7/408* (2013.01)

(58) Field of Classification Search
CPC ........................................... G06T 2207/30188
See application file for complete search history.

(56) References Cited

U.S. PATENT DOCUMENTS

| | | | | |
|---|---|---|---|---|
| 5,144,767 A | * | 9/1992 | McCloy | A01M 7/0089 47/1.7 |
| 7,723,660 B2 | * | 5/2010 | Holland | A01B 79/005 250/206.1 |
| 9,736,400 B1 | * | 8/2017 | Ferguson | H04N 5/33 |
| 2008/0176263 A1 | * | 7/2008 | Schultz | G01N 33/54386 435/23 |
| 2013/0044919 A1 | * | 2/2013 | Purcell | G01N 21/25 382/110 |
| 2013/0325346 A1 | | 12/2013 | McPeek | |

(Continued)

OTHER PUBLICATIONS

Ashourloo et al. Evaluating the effect of different wheat rust disease symptoms on vegetation indices using hyperspectral measurements. Remote Sensing. Jun. 5, 2014;6(6):5107-23.*

(Continued)

*Primary Examiner* — Fabio S Lima
(74) *Attorney, Agent, or Firm* — Steven A. Nielsen; www.NielsenPatents.com

(57) ABSTRACT

Attributes of vegetables or biologics are derived by use of color imaging sensors and relative spectral band analysis. Enabled smart phones or dedicated single pixel or focal plane instruments for crop applications to quickly report the biological condition of vegetables or other organics by providing an augmented view or relative quantification of RGB of the inspected items. Disclosed embodiments are well suited for analyzing the health and needs of living plants or crops. Ratios of observed wide band red, green and blue are compared on a relative basis. While food shopping, an enabled smart phone may view a collection of produce and display each piece of produce in a manner disclosing a quality ranking. Thus, a consumer may view produce through a smartphone camera and quickly evaluate its relative quality. Novel approaches are used to associate the calculated data with the original source imagery.

6 Claims, 11 Drawing Sheets

(56) References Cited

U.S. PATENT DOCUMENTS

2013/0326941 A1* 12/2013 Pickett .................. A01G 7/045
 47/1.4
2014/0293091 A1* 10/2014 Rhoads .................. G01J 3/513
 348/234
2016/0000026 A1* 1/2016 Jiang ........................ A01H 5/08
 800/260

OTHER PUBLICATIONS

Intaravanne et al. "Cell phone-based two-dimensional spectral analysis for banana ripeness estimation." Sensors and Actuators B: Chemical 168 (Jun. 20, 2012): 390-394 (Year: 2012).*

* cited by examiner

ANALYSIS OF BIOLOGY BY MEASUREMENT OF RELATIVE WIDE SPECTRAL BANDS OF REFLECTED LIGHT AND FLUORESCE LIGHT

CROSS-REFERENCE TO RELATED APPLICATIONS

This utility application is a continuation in part to U.S. application Ser. No. 14/135,363 filed on Dec. 19, 2013; the Ser. No. 14/135,363 application claims the benefit of priority of U.S. Provisional Application 61/739,357 filed Dec. 19, 2012; the contents of the related applications are expressly incorporated herein by reference in their entirety.

BACKGROUND OF THE INVENTION

(1) Field of the Invention

The invention generally relates to color analysis of plant life. More particularly, the invention relates to the use of broadband color spectrums and various systems and methods to enhance and correlate the electronic display of agricultural products digital analysis to provide relevant information in a visual format.

(2) Description of the Related Art

U.S. Publication 2013/0325346 by McPeek and published on Dec. 5, 2013 discloses a system for observing and monitoring agricultural products. But, McPeek fails to disclose or suggest the use of wideband color analysis to grade or judge agricultural products.

In the known related art, spectral narrowband measurements have been used to evaluate organic objects. But, there is a serious shortfall in the related art as consumer devices with image sensors, such as smart phones, are typically burdened with infra-red (I.R.) or Bayer filters that interfere with measuring narrowband light frequencies. Thus, there is need in the art for new means and methods that eschew the use of narrowband frequencies to analyze agricultural products without removing integral optical components.

BRIEF SUMMARY OF THE INVENTION

The present invention overcomes shortfalls in the related art by presenting an unobvious and unique combination, configuration and use of methods and devices using wideband light frequencies and other techniques to present an altered view of agricultural products to quickly and visually report ripeness, health and other characteristics.

After an agricultural product has been electronically viewed, or contemporaneously with such a viewing, the electronic display of the product is altered to accentuate desired properties. For example, an enabled consumer smart phone may present an altered view of a produce bin, with each piece of produce displayed in a manner to convey its relative ranking or quality.

Living plants or crops may be viewed by a consumer device and the electronic display may be altered to emphasize attributes relevant to the care of growing plants.

Other disclosed embodiments include devices to measure inorganic and inorganic spectral measurements such as germs, hair color, surface color matching, pollution, gems, mold and virus detection.

Disclosed embodiments avoid the required narrowband frequencies by several methods and systems which include:

The relationships of wide bands and comparisons to make relative quality assessments.

The use of auxiliary lighting sources, such as flashes and lighting of specific spectral values.

The use of thermal sensors.

The use of a laser projector device.

The use of image sensors of one or more pixels to produce one or more collections of image data.

The use of image processors to modify wideband RGB data to display or to use broad spectrum ratios in a step of analysis or to directly augment the display of products.

The calibration of an image processor to comport with the optical character of the particular smart phone being used and lighting conditions.

The determination of weighted coefficients to enhance the calculation results that are determined by the spectral response of the objects to be measured.

The use of known spectral response of objects in the field of view and subsequent wideband values.

The use of relative wide band values of multiple objects in a field of view.

The use of comparisons to known measured characteristics.

EMBODIMENTS FEATURES AND OVERVIEW

While the use of wideband comparisons, ratios and auxiliary lighting may not be precise as narrowband spectrometry, wideband comparisons can provide valuable comparative information as disclosed herein.

Inefficiencies in the prior art are overcome by the stream lined image processing of wideband RGB data to directly alter the display of a subject product or group of products. Unexpected results and efficiencies have been obtained using subtraction techniques with auxiliary lighting such as a camera flash or narrow band lighting.

Inefficiencies in the prior art are overcome by directly altering the display of a product to be evaluated by use of measured then calculated RGB ratios using formulas values as described herein.

Disclosed embodiments overcome the shortfall of Bayer filters, IR filters and other obfuscations of narrowband spectrometers or smart phones by utilizing wideband RGB values from the digital output and manipulating the separation of colors by methods described herein.

In general disclosed embodiments use wideband RGB in place of pure or absolute values of RGB. Methods include comparisons of multiple objects displayed in an enhanced single image. Methods include the creation and display of from one or more multiple images taken nearly simultaneously or over time depicting single or multiple objects.

Disclosed systems and embodiments include the use of optional enhanced lighting to improve results or to enable methods of image processing including subtraction over multiple images. Disclosed systems and embodiments include image processors enabled to create images or augment images based upon wideband RGB ratios and/or derivative formulas such as $(g-r)/(g+r)$. The derivative formulas are based on biological characteristics that have been researched and published, but have been transformed for wideband calculations using the described methods and systems herein. Created or augmented images may be displayed in grey scale of pseudo color for dramatic effect.

Disclosed systems and methods include the use of creating or augmenting images in pseudo color or grey scale correlated to the analysis. Such methods include separating color and grey scale components of the original image and recombining the color components with the new calculated grey scale.

Disclosed system components include wideband sensors, such as those native to current smartphones, memory for image storage, image processors used to execute machine readable instructions to implement the disclosed methods, auxiliary lighting, methods to trigger auxiliary lighting and look up tables to compensate for smartphone or other device characteristics or for analytic comparisons of the light reflection properties of a photographed subject.

Figure 1:
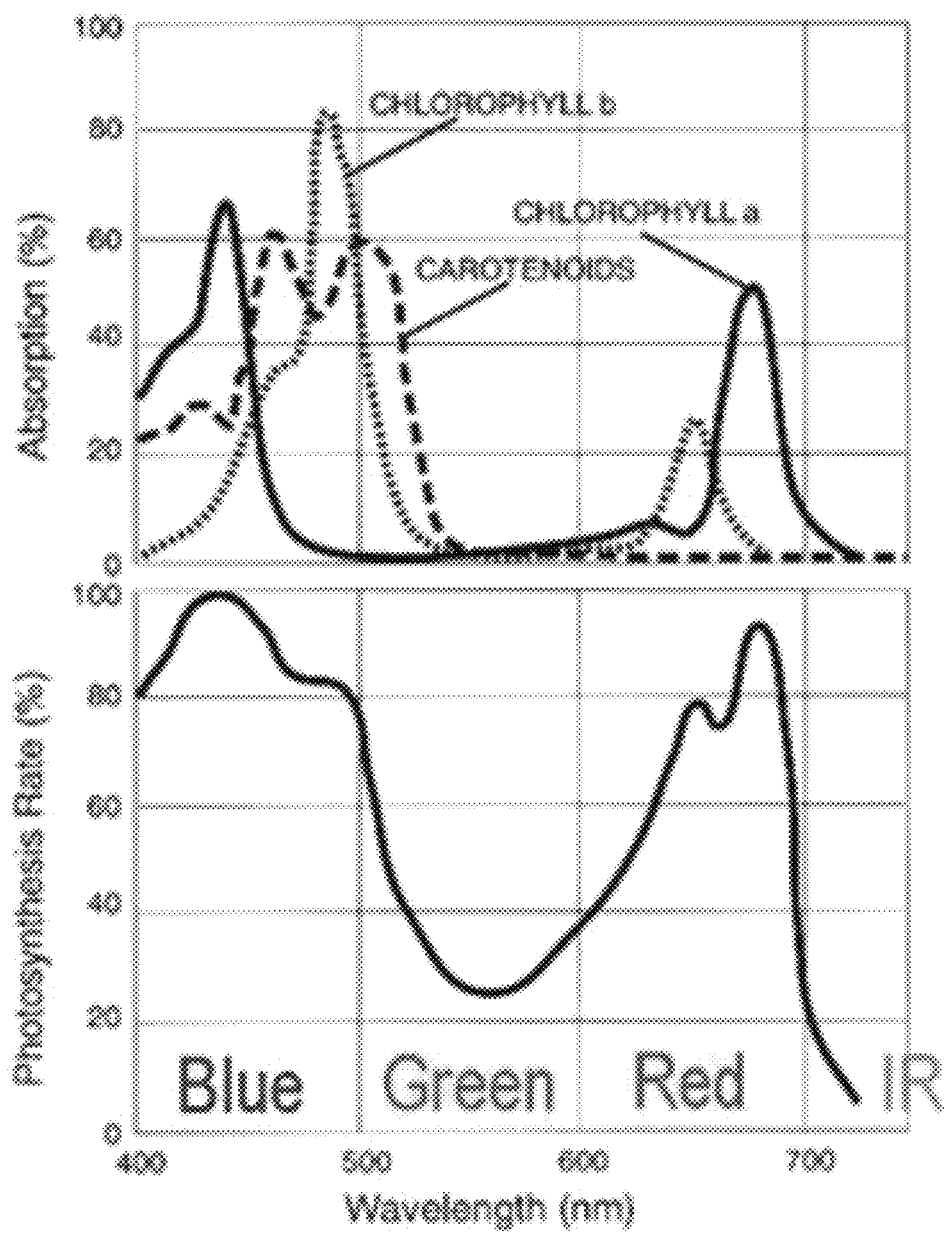
FIG. 1 is an upper and lower graph of some of the spectral characteristics of plants compared to light frequencies.

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

BACKGROUND

Spectrometers have been widely utilized for spectral analysis for many years. They typically analyze spectral characteristics in narrow bands. A prior art or current art shortfall is that most imaging devices, such as a mobile phone or silicon based imaging sensor have filters that prevent effective narrowband analysis to be used in qualitative and qualitative and quantitative analysis.

A video camera or image sensor such as those found in cell phones use wideband filters for color differentiation. A cell phone or smart phone usually measures visible light only and cannot provide spectral bands quantification at specific narrow band spectral frequencies without the use of lens filters. The IR and or Bayer filters allow for broadband measurements only. The output of these cameras are is compromised by including various proportions of red, green and blue spectral values and are not congruent to pure red 600 to 700 nm, pure green 500 to 600 nm or pure blue 400 to 500 nm. The solution is complex as the spectral properties of both organic and inorganic objects have their own independent spectral responses that also can include a mixture of narrow band responses in the red, green and blue values that do not coincide with the pure RGB color spectrum and can include ranges in all three colors.

In addition, the color sensor itself does not adhere to pure RGB colors and can overlap ranges. For example, camera blue can range from 400 to 580 nm, camera green can range from 450 to 620 nm while camera red can range from 520 to 700 nm and is compromised further by varying sensitivities across the spectral bands. Thus, spectral analysis in specific ranges becomes problematic.

Disclosed embodiments overcome these prior art shortfalls by:

Exclusive use of wide band RGB outputs and their relative ratios and calculated relationships rather than absolute values.

Use of a flash with known spectral properties.

Use of auxiliary lighting with specific narrowband spectral properties.

Use of image processing including subtractive techniques.

Exploiting unique spectral responses of objects in the field of view.

Using relative values of multiple objects in a field of view.

Using comparisons to known measured characteristics.

Use of measurement of thermal and fluorescence response to light.

To overcome the prior art shortfalls mentioned above, the biological analysis may be ascertained by use and manipulation of a wideband digital output and accepting relative values as solutions rather than absolute values. Since physical objects have their own specific spectral properties in addition to the sensor/camera properties, true RGB relative values may be deduced or inferred by the relative changes in the sensor wide band RGB that are compared in multiple images, or objects in a single picture or by the use of auxiliary lighting and other image processing techniques.

Referring to FIG. 1, in an upper graph, spectral characters of plants are plotted over a lower graph comprising a combined spectral curve wherein green is purely 500 to 600 nm, pure red is 600 to 700 nm and pure blue is 400 to 500 nm The true blue (400 to 500 nm) range includes response to chlorophyll a, chlorophyll b and carotenoids. The amount of chlorophyll photosynthesis is indicative of plant health, so the ratios, as used herein, between pure green, red and blue, are indicative of plant health. Such ratios and/or total values derived from wideband sensors are therefor also indicative of the relative health of multiple plants in a picture if the analysis is based on the transformed formulas that consider sensor wideband sensitivities across multiple bands.

In a disclosed embodiment, the display of an organic product is altered by use of an image processor and/or through image processing techniques wherein the ratios described above are used to alter displayed pixels depicting objects having different calculated relationships than others in the same picture. To implement this embodiment using consumer smart phones and other devices burden with Bayer and/or IR filters, various challenges must be overcome and are as described herein. One such challenge is true RGB separation, which is adversely impacted by use of Bayer and IR filters. The lack of true RGB separation may be called an ambiguity. An embodiment herein resolves the ambiguity by a new system of and use of auxiliary lighting and image processing and acceptance in some instances of relative values as a solution rather than absolute values.

In one disclosed embodiment, problems of the prior art are solved by use of making relative comparisons of multiple objects in a single image or from two or more separate images. The ratios of overlapping bands and known spectral relationships of each measured object in an image and will affect the complex sum and ratios of the widebands' relationships. In another embodiment, the use of auxiliary lighting and image processing as described herein will assist in resolving ambiguities. In one example, the ambiguity is resolved by 1) using auxiliary light, such as a camera flash having known light frequencies or an LED with known narrow band light emission characteristics and 2) application of image processing techniques and 3) known or predicted biologic relationships that relate to spectral measurements in wide bands. Two images can be taken in rapid succession with and without the auxiliary light and image processed.

Figure 2:
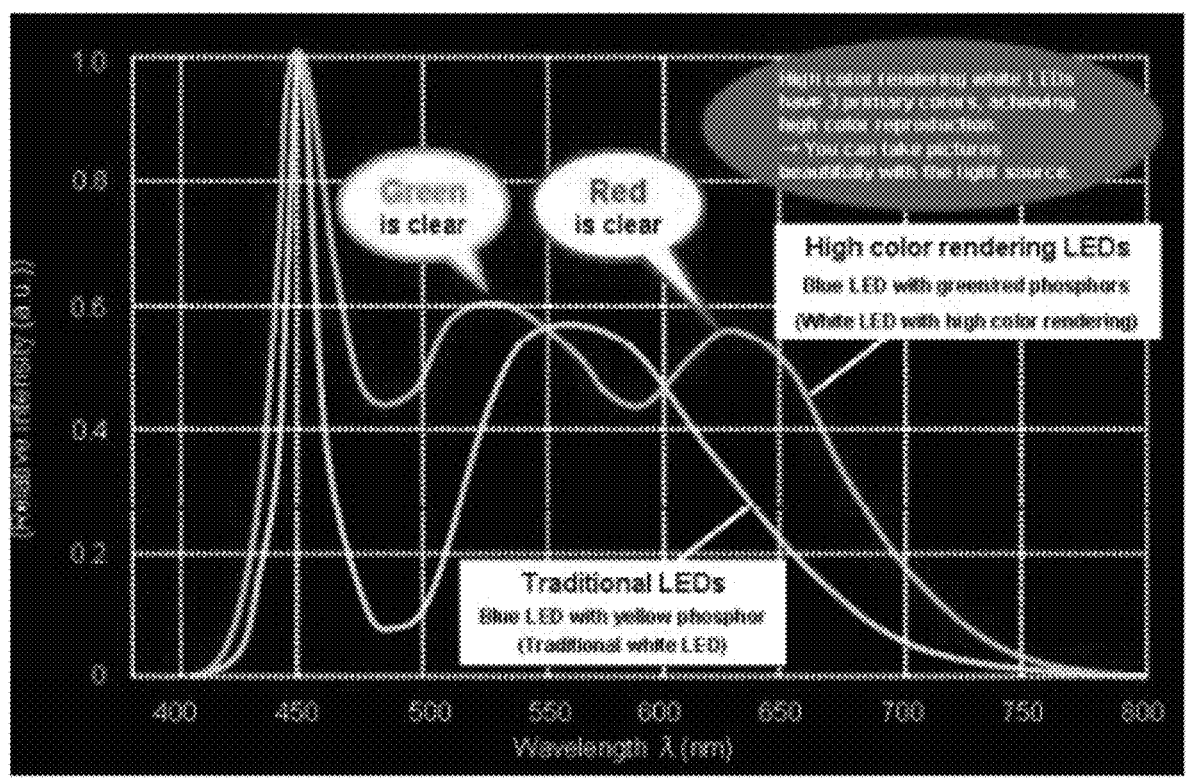
FIG. 2 depicts a spectral curve of a camera flash

For example, in FIG. 2 a flash curve shows a high intensity light at 450 nm. Thus, when the same picture is taken without the same flash and is subtracted from its analogous flash version, the dominant change in the blue channel will be around 450 nm. The ratio of this blue to green or red is determinate of biological characteristics. The predominant change in the green channel would be 540 to 600 nm. Referring back to FIG. 2, the curve of traditional LEDs is typical of most camera flashes and highlights the wavelengths of 450 and 540 nm and some increases in red. Although the specific broadband blue, red and green channels may all be affected by the 450 nm light source, the comparisons of the broad bands will reveal the dominant required spectral data for biologic analysis.

This disclosed system overcomes the prior art shortfalls which use spectroscopy with specific narrowband wavelengths. Disclosed embodiments overcome such prior art and shortfalls by a relative value approach which uses wide band comparisons of RGB channels as derived from typical consumer smart phones with image sensors that are burdened with Bayer and IR filters.

An indicator of age is the ratios of chlorophyll b to carotenoids. As a fruit or vegetable ages, chlorophyll b levels go down and carotenoids increase more rapidly. Thus, as used herein, the ratio of carotenoids to chlorophyll validly reports biologic age. Ripeness can be rated by the ratios of green to red or green to blue depending upon the vegetable variety. A tomato for example as it ripens changes from green to red. Blue generally increases as a vegetable ages and red reflection increases at a greater rate as the absorption of red decreases with time. Therefore green blue ratios also can reflect age. Another technique is the measurement of fluorescence. Certain vegetables such as kale or broccoli will emit light as a result of the organic photosynthetic chemistry when subjected to a pulse of bright light such as a flash from a camera or cell phone. These emissions can be measured in the wideband channels and are indicative of the vegetable's photosynthetic activity chemistry. Other vegetables, such as potatoes have unique chemistries with their own color qualities. For example, as a potato ages, it reflects more green and absorbs less blue and red. What is important is the relative comparisons of green to other similar potatoes or the red blue relationships.

There are specific ratios in the pure spectral red green and blue spectra as seen in FIG. 1. In the example of agriculture, the ratio of chlorophyll b in the entire broad band of the red channel when compared to the chlorophyll b in the broad band blue channel is a constant. See FIG. 1. as well for the effects of chlorophyll b and carotenoids in the pure rgb bands.

Figure 3:
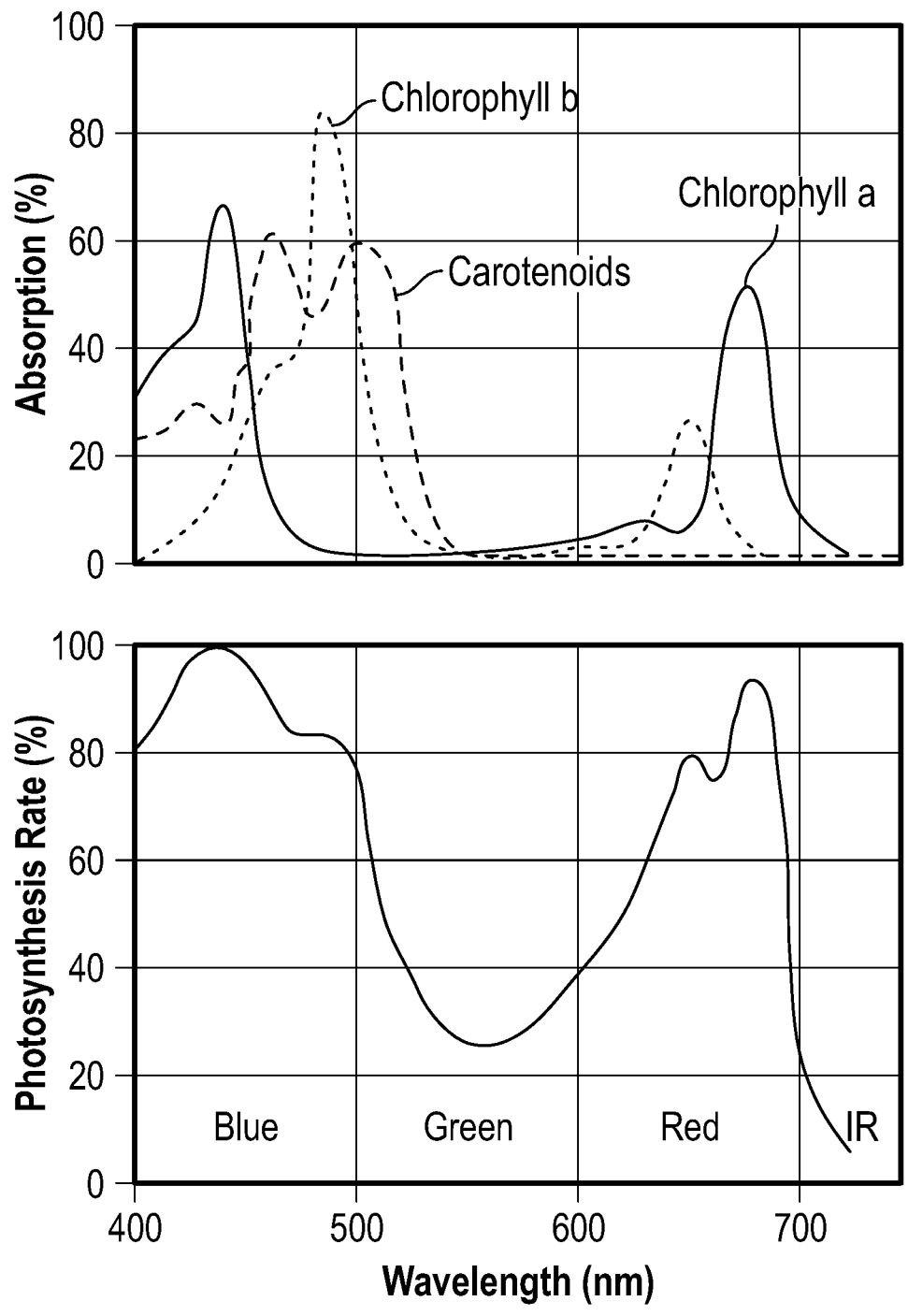
FIG. 3 depicts an absorbance curve or spectral characteristics as shown in FIG. 1
Figure 4:
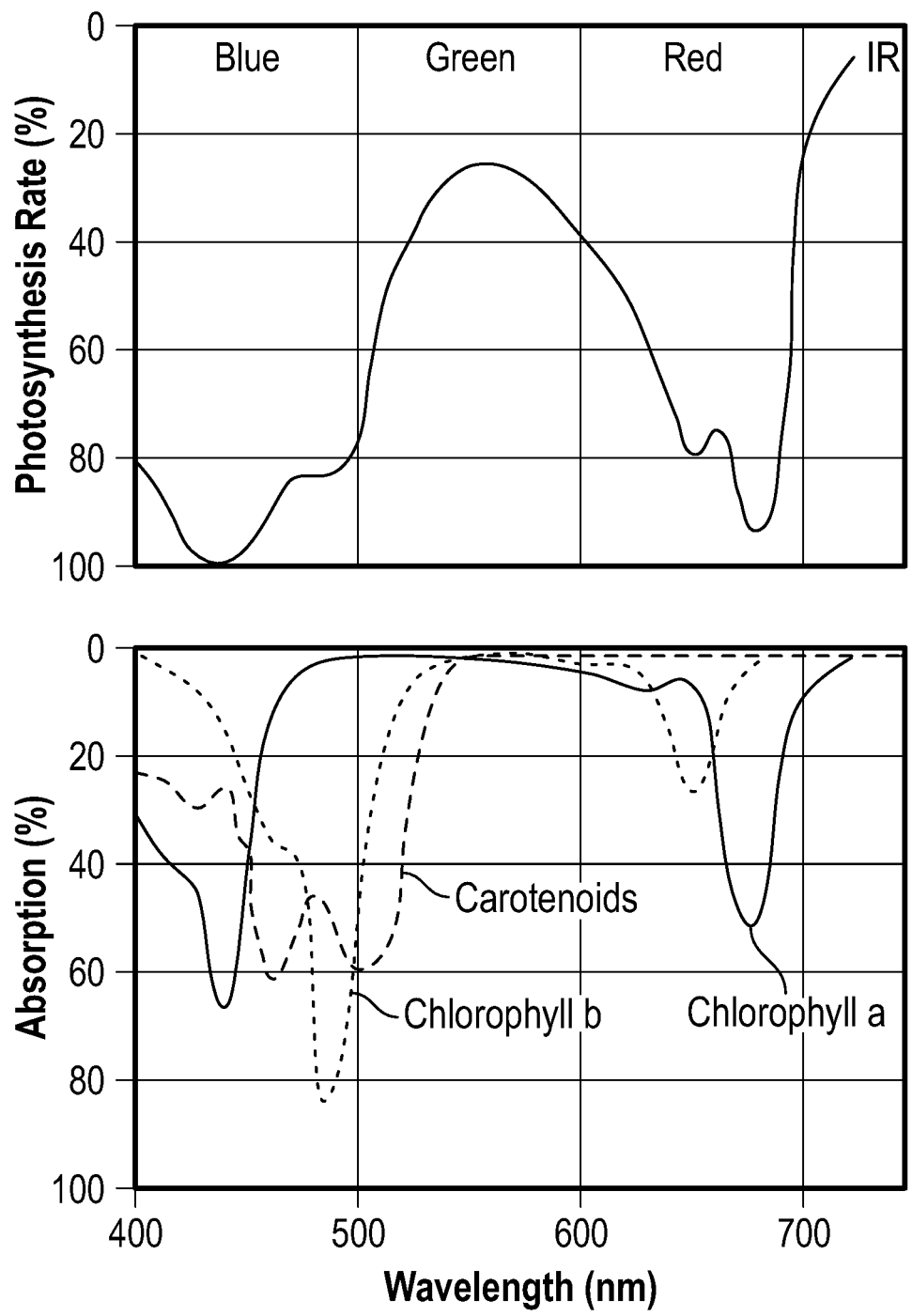
FIG. 4 depicts a reflection curve, being an inverted depiction of FIG. 3

FIG. 3 is an absorbance curve, while FIG. 4 is a corresponding reflection curve, FIG. 4 being an inverted representation of FIG. 3.

Figure 5A:
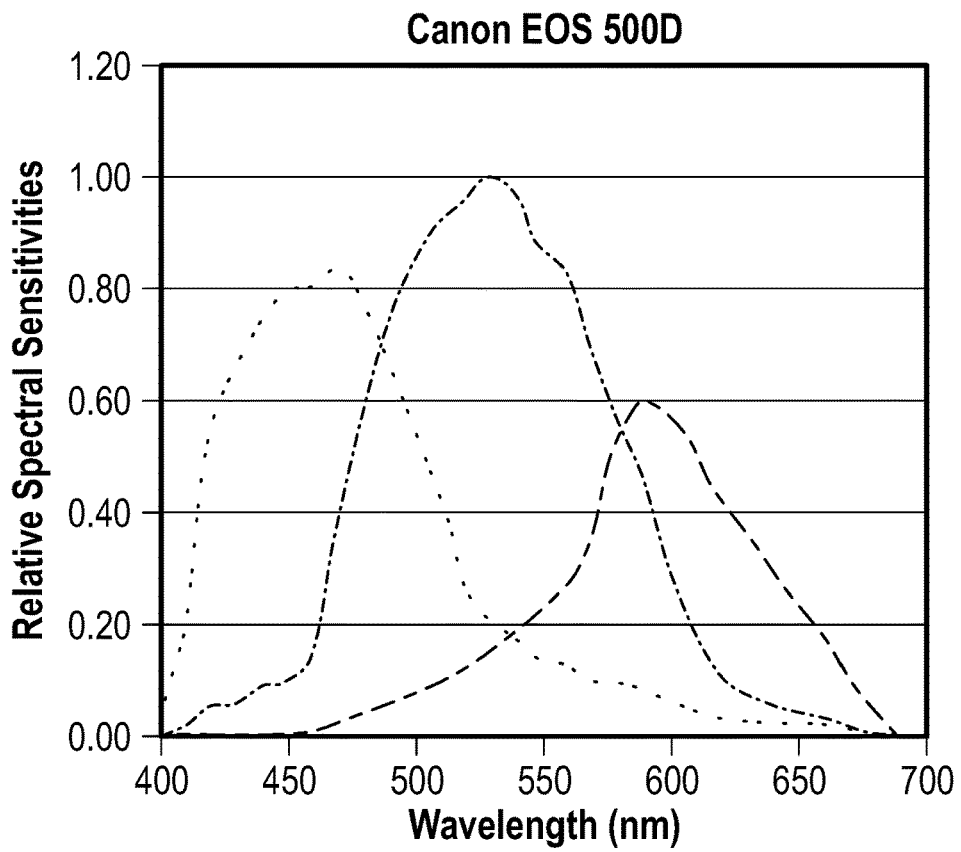
FIGS. 5A, 5B and 5C depict various light spectrum curves from a typical camera and registered with the biology curves.
Figure 5B:
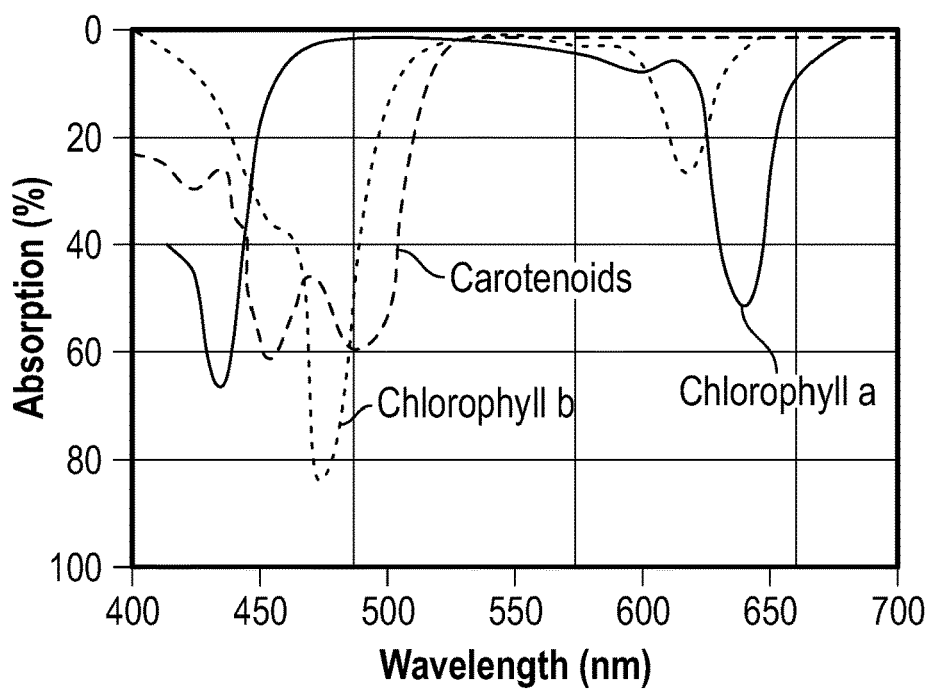
Figure 5C:
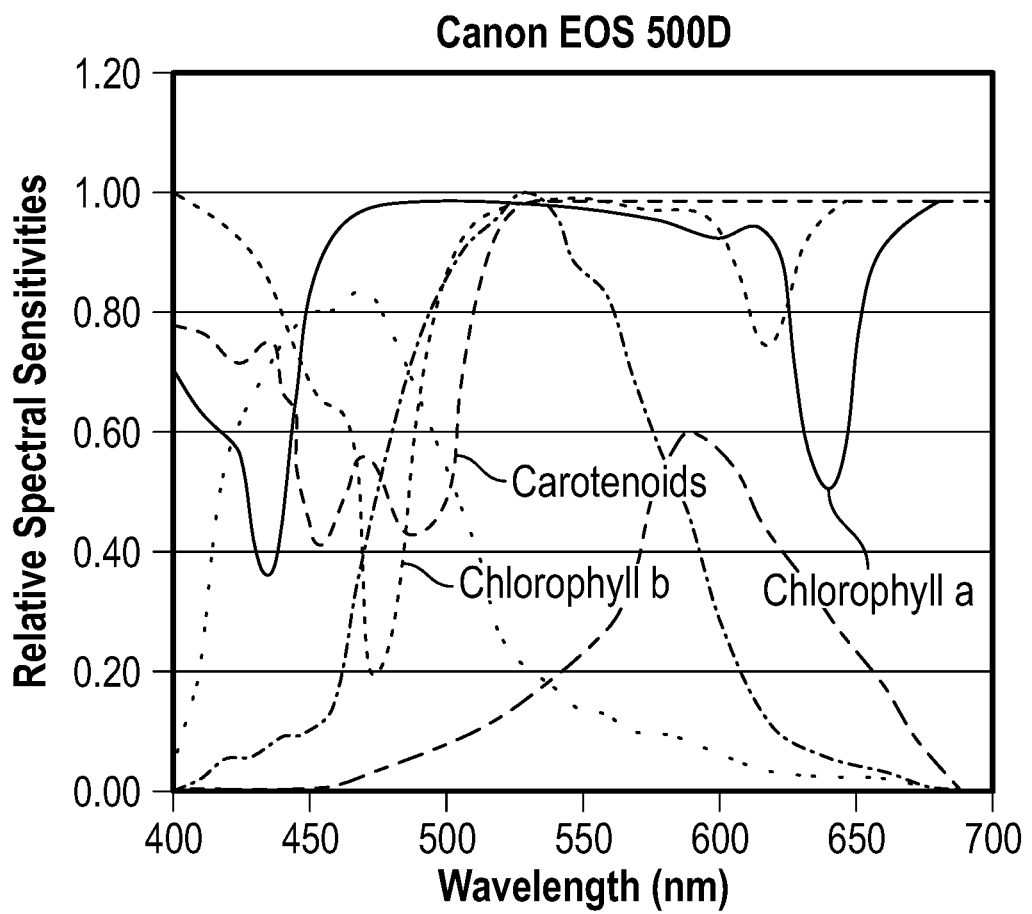

FIGS. 5A, 5B and 5C assist in an interpretation showing in FIG. 5A a spectrum of a camera burdened with a Bayer filter curve, FIG. 5B, a reflection curve and 5C, a representation of FIG. 5A transposed onto FIG. 5B.

Figure 6A:
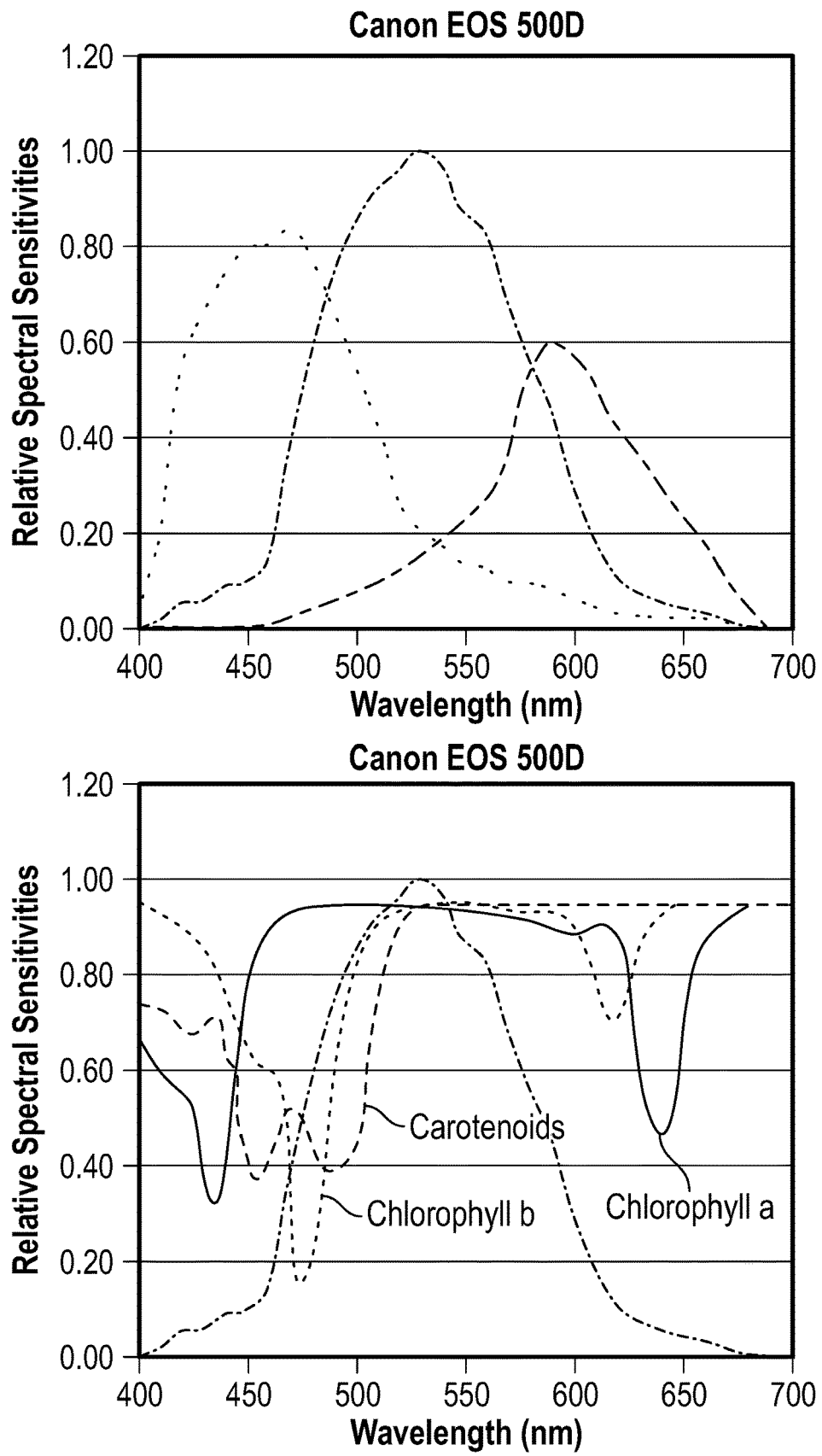
FIG. 6 depicts comparisons of red green and blue channel curves and the relationship to the biology.
Figure 6B:
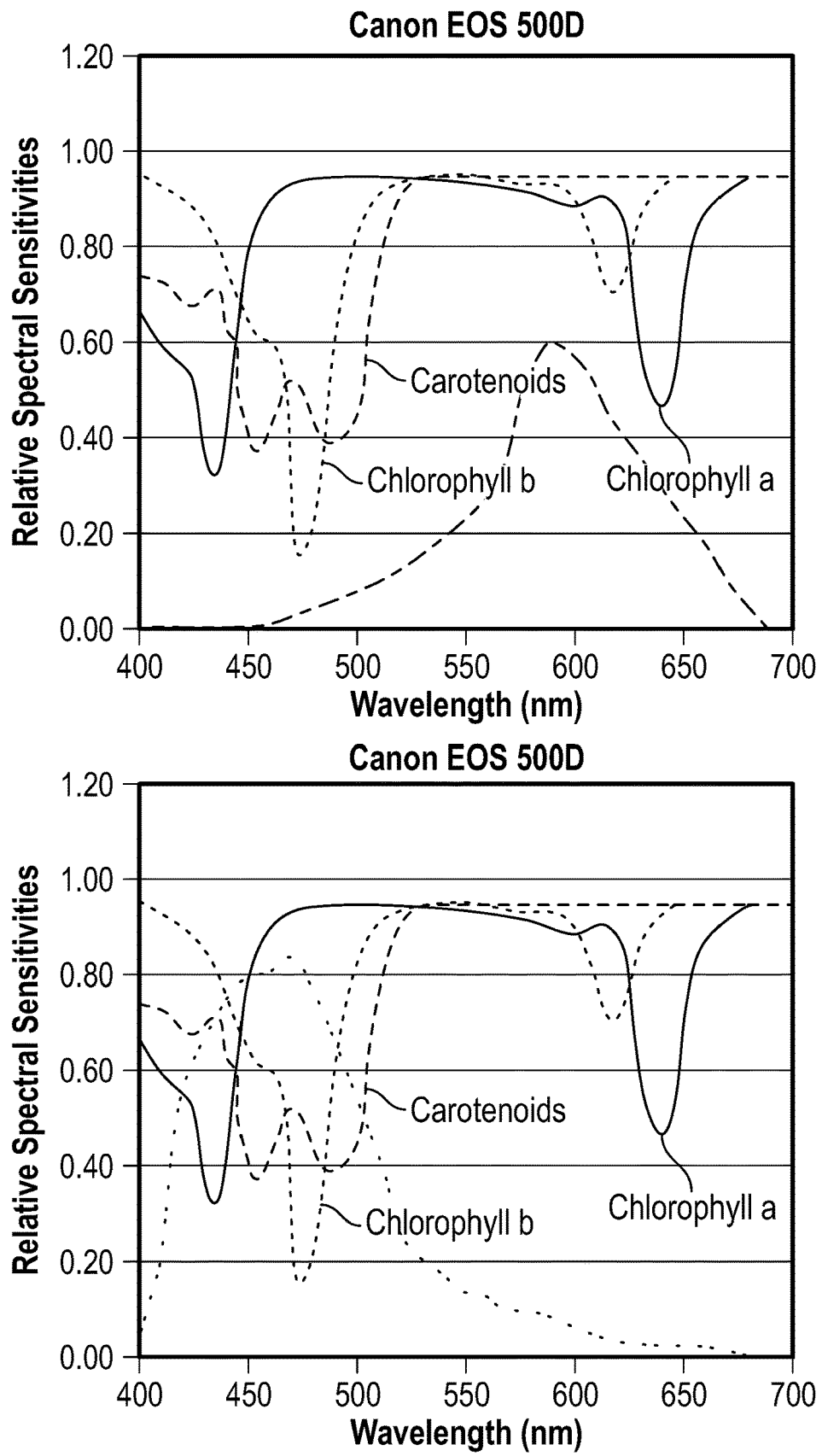

FIG. 6 presents individual channels. The comparison or analysis conveys an understanding of the spectral relationships and how a cell phone will respond. For example, in the red channel, changes in chlorophyll a will have some impact in the red channel but a larger impact in the blue channel. Chlorophyll b results in a relatively modest impact in the green and red channels, with a larger impact in the blue channel. Carotenoids have a bigger impact in the green channel and blue channels. So subtraction of the red minus green channels will be somewhat related to the value of the carotenoids. Relative values of chlorophyll a, chlorophyll b and carotenoids can be inferred by a comparison of the areas under the sensor curves for each component broad wavebands using relative simultaneous equations that can infer relative values, but not absolute values in many instances.

As illustrated and/or inferred, the blue channel will be sensitive to changes in chlorophyll a and b and carotenoids. The green channel will be most sensitive to carotenoids and chlorophyll b changes and the red channel will be most impacted by chlorophyll b and less by chlorophyll a. Therefore there are three variables and three simultaneous equations can be solved with only ratios between the values. Specific absolute values can then be approximated by using measured light values from the camera's automatic light meter, auto focus system or IR distance detector if available. These relative ratios can be further resolved by using the known distance from lens to the object and measuring the amount of reflected light to the lens. Distances from the subject to be analyzed to the lens which can be identified by the focus distance reported from the auto focus feature of a cell phone or video lens or IR distance detector.

By creating look up tables for the unique Bayer filter curves for a specific cell phone or video camera, the values of the chlorophylls and carotenoids can be inferred. In a single picture with multiple fruit, qualitative values can also be easily displayed by comparison of the relative values to established curves empirically determined.

For plants, the changes in the relative ratios of wideband RGB taken over time can determine health status by noting changes in wideband ratios and relationships.

Measuring and comparing the relative ratios of r/g, b/g and or r/b to can be used to assess the relative health of a plant. Derivative formulas can also be used such as differences between RGB wideband channels, or common arithmetic expressions such as square or log or subtraction or combinations.

In general blue reflected light tends to remain the same and gradually increase as a plant or vegetable ages, green absorbance varies according to how much active chlorophyll is present and red varies according to the actual photosynthesis occurring that is absorbing red light.

Color calibration in the methods described in these claims for weighted color coefficients can be based on the desired spectral characteristics of the object to be measured rather than the color characteristics of the imaging sensor against a standard neutral background. This will modify the RGB coefficients to maximize the deltas in the derivative formulas.

Further Shortfalls in the Prior Art

Researchers have used specific spectral lines to characterize vegetables. Unfortunately, these analytic procedures cannot be generally done on a cell phone due to the required narrow wavelengths. By using the relative wideband RGB channel values of a cell phone, and their relative values biologic characterizations can be inferred.

Examples of WideBand Transformations

An example is Peñuelas et al., 1994 Rodriguez-Perez et al., 2007

$$NPCI=(R680-R430)/(R680+R430)$$

normalized pigment chlorophyll ratio index
This translates to
Carotenoid/chlorophyll a+b and translates in general to wideband $$(G-R)/(G+R)$$

Or to determine the pigment chlorophyll index using a cell phone where X, Y, Z are weighted coefficients determined by the individual cell phone spectral response curves or generalized spectral response from the object for each of red, blue, green widebands.

$$X*(\text{Red Channel})-Z*(\text{Blue Channel})/X*(\text{Red Channel})+Z*(\text{Blue Channel})$$

Another example is
PSRI=Merzlyak et al., 1999
(R 680–R500)/R750 translates to wideband (red-green)
Plant senescence reflectance index
X*(Red Channel)–Y*(Green Channel) and since we only need relative values, the infrared R750 need not be considered.

Figure 8:
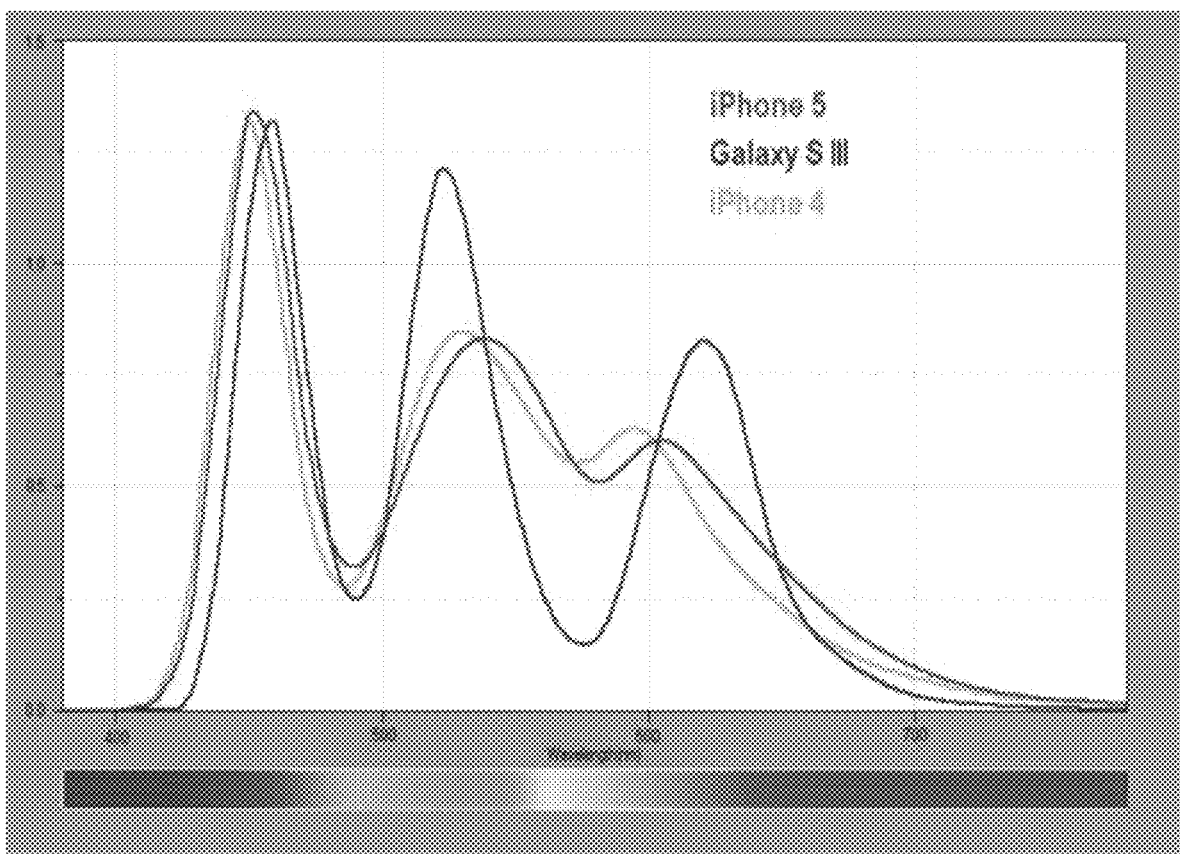
FIG. 8 is a chart depicting various display properties of three current smartphones.
Figure 9:
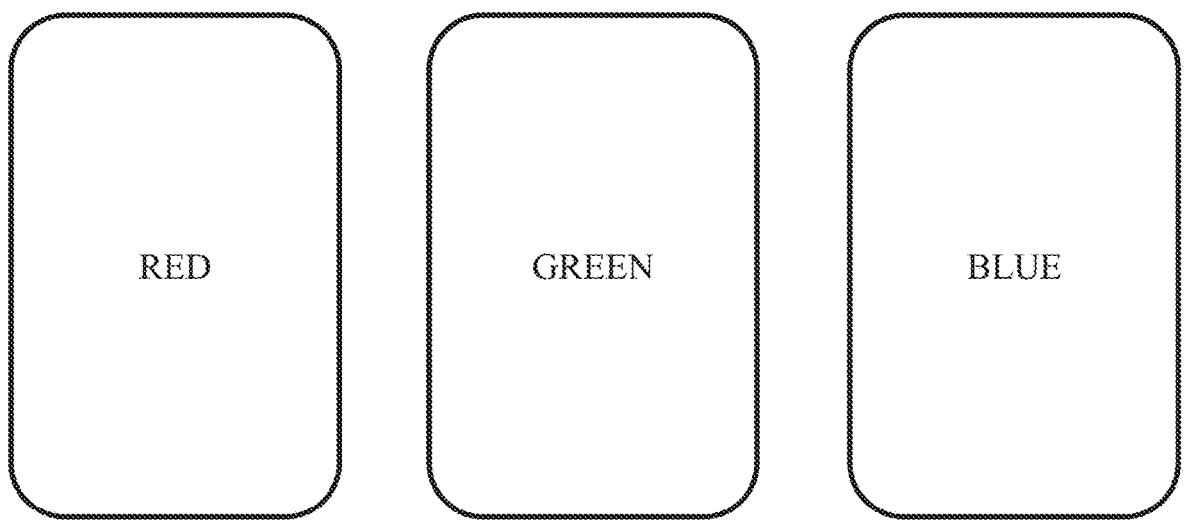
FIG. 9 depicts three smart phones used as a source of auxiliary lighting. A smart phone display emits solid red, green and blue known wavelengths.

FIG. 8 depicts properties of various smartphones.

Narrow Band Light

Figure 7:
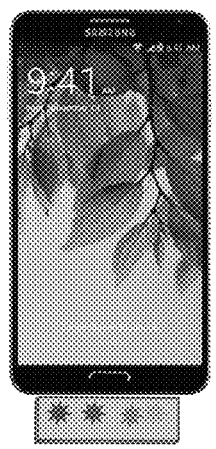
FIG. 7 depicts typical smart phone color sensitivities.

FIG. 7 depicts a typical smart phone with a cube that can plug in to the USB or audio ports of the smart phone or similar device. The cube or other ancillary attachment may have narrow band LEDs controlled by the device to flash light in sync with the camera shutter.

By using narrow band lighting, such as led or laser light sources, image subtraction processing and using relative and not absolute values, many tests can be done in wide bands. It is not an absolute method, but in this instance using relative values, will produce the desired relative results.

An example of a transformation where narrow band auxiliary light could be useful is Gitelson-Car1 [R(510-520)–1–R(540-560)–1]*R(760-800) Gitelson et al. (2003, 2006) In this instance narrow band light at 510 and 520 can be used with wide band green. The transformation is (Y2*G510-Y2*G520)–1–Y1*G–1) with the remaining variable R(760-800) considered a constant. The relative value is the objective not the absolute. Y2 is a weighted coefficient for the auxiliary light For plants, adding auxiliary lighting at the peaks of the curves yields more accurate results. For example, carotenoids=460 and 500 nm; Chlorophyll a=430 and 665 nm; chlorophyll b=410, 470, 647 nm. The ambient light curves would be subtracted from the curves taken with the auxiliary light. In this instance, the wideband RGB channel efficiencies at these wavelengths would also need to be considered.

Use of auxiliary light source that is designed to provide narrow bands of light that are interpreted by the mobile phone or other image sensor or sets of pixels such as a thermal camera that can measure temperature. The lighting patterns are triggered and captured in synchronicity with the mobile device hardware and or software. These light sources can be lasers that have wide area fields of view. Specifically 532 nm, 405 nm and 667 nm lasers.

In an example of measuring anti-oxidants, the specific measurements with and without a 532 nm laser and subtractive image processing will indicate antioxidant activity of a vegetable due to the xanthophylls which mediate thermal dissipation of light energy absorbed by chlorophyll. A thermal band sensor would further assist in the characterization.

The specific photosynthetic analysis can also be used to control water, light or fertilization systems that respond to a plant's photosynthetic state that do not require a graphic display of the information.

Thermal bands can be used to ascertain light converted to heat values to indicate the status of photosynthesis activity. When usable light levels are exceeded for maximum photosynthesis, light is converted to heat.

Water stress, nitrogen levels and disease detection can also be monitored by wideband RGB analysis.

Process and Method Description

In general, the first step is to take a picture with ambient light (A) and auxiliary light that can be from an external light such as a flash or narrow band led or from the display screen itself.

Disclosed embodiments include a process to capture wideband RGB data and present the subject object in an augmented view to highlight relevant attributes. The process includes:

1. Capture wideband RGB data or the image.
2. Calibrate the weighted RGB coefficients to normalize the RGB values. In this instance, red=1, green=5 and blue=4. The specific ratios can be determined by normalizing the predominant color of the item to be measured to a fixed variable. For example, red in the instance of a red tomato, is normalized to one or the green value is normalized to one in the instance of green vegetables to determine the coefficients where R×R(c)=B×B(c)=G×G (c) where (c) is the coefficient and R G or B are the output values. Alternatively all values can be balanced to white, however, normalized to the dominant color or coefficient determined by the object to be analyzed may produce greater differentiation.
3. Select desired characteristic such as senescence and formula or ratio.

In this instance camera blue/camera green or camera red and apply to all items in the picture using the normalizing coefficients from step 2.

4. The program will perform a specific transformation of the image such as a ratio of camera green/camera blue for every pixel. A calibration step (coefficient) for each of the RGB channels is applied information applied the camera output to maximize the scale of differentiation of the ratios. For example 5× Green value/4× blue value.
5. Display the image with the calculated pixels using a grey scale or colorized ranges.

An additional display technique is to divide an original image into rgb or other component technique and grey scale ranges.

Then recombine the image substituting the calculated grey scale for the original grey scale.

Other combined images can be done using one or more color picture components from the original picture that is substituted with the calculated image.

Alternative Embodiments

The image sensor can be one or more pixels with two or more data points. The output data points can be over time or over different lighting conditions. A memory unit is required for comparison of data points taken over time.

The method and use of an image sensor in a mobile phone or other imaging device or pixel array to determine qualitative relative characterization based on both the spectral characteristics of the image sensor and or an object's or multiple objects' physical properties to be measured.

The method above using one or more pictures or data points with or without flash or other auxiliary lighting with known spectral characteristics and or and subtractive image processing techniques. Broad band output ratios or other RGB formulas can be used to infer qualitative and quantitative assessments.

The relative comparison of spectral qualities of organic or inorganic objects utilizing the broad spectral responses of a mobile phone, camera or other sensor compromised by a Bayer or other color filter to characterize a relative quality by quantifying one or more of the spectral RGB outputs of a imaging device and or relative ratios of objects within a frame and calculating the desired parameter that utilize a known spectral characteristic or response to light of the object to be measured. These known spectral responses can include characteristics of, fluorescence, absorption, light saturation and reflection in specific spectral bands.

Determination of relative spectral properties of multiple objects in a single image by comparison of their measured RGB ratio values of the device. An image is acquired by the device. Then a specific ratio or formula is selected corresponding to the desired characterization. The full image is processed according to the formula. The relative ratios or formula outcome are used to modify the image to provide the characterization through shading, color, outlining or other form of object segmentation.

The method above where is single object is characterized by comparison to a previously acquired data set or image.

The method above where subtraction or image processing techniques that utilize known auxiliary light source spectra to enhance the fidelity of RGB data.

The use of two or more images to acquire the relative RGB values by using image processing techniques that consider differences of images with or without auxiliary light with known spectral characteristics or Additional lighting provided by spectral filters placed over on board light or from the display side of a mobile device and using the selfie imaging sensor.

Combinations of the above

Taken at different times, for example before and after a saturating light source sequence flashes.

Assessing organic characteristics of individual objects by measuring the relative spectral characteristics that change by the amount of light and time of illumination and quality of light interacting with the organic or inorganic chemicals of the object with known standards. The measurement of the ratios between R, G and B outputs can be used to indicate the health of the plant related to environmental requirements such as light, hydration fertilization. Additionally health conditions such as the optimal RGB ratios can be identified for a specific cell phone and adverse problems such as insects, root rot, bacteria, virus or other pathogens can be discovered.

Because of organic chemical physics, where additional light is transformed to energy, qualitative and quantitative assessments of organic photosynthesis can be enhanced by considering changes in temperature as well as spectral analysis.

In the instances where quantitative results cannot be calculated, relative comparative qualitative analysis of the object or objects can be determined by comparison to other objects in the image or by comparison to multiple images or data points from a single pixel taken over time under different lighting, time or temperature variables. A thermal sensor can be added to better characterize the results. For example, under the condition of light saturation for photosynthesis, the heat conversion of light coefficients will increase.

The use of this data to control other devises such as power or digital control signals.

This information can be used to control independent devices such as lighting or sorting devices. In particular led lighting can be modulated by frequency or intensity according to a plants absorption of red and or blue light or other RGB ratios for example when light saturation has been achieved.

These RGB relationships are not limited to biology, but can be also used for color matching, measurements of pollution, can be used with chemicals to produce spectral characteristics for both organic and inorganic spectral measurements. Examples include gems, hair color, surface color matching, pollution, mold and virus detection.

Using the Display Screen as an Auxiliary Light Source
Cell Phone Display Embodiment FIG. 8 depicts properties of various smartphone displays.

Another approach includes the use of the cell phone screen to display specific colors of light and then compare the vegetable, fruit or plant's response to the colored light.

Using a display as a light source to assess spectral qualities can be done by using for example the selfie camera and a cell phone display. The display's output when a solid color of red, green or blue with a specific known frequency can be created and displayed. This known light source can be used to resolve the ambiguity and provide color response values for the specific spectra emanating from the cell phone display.

Using the display screen as a light source and other features of a typical smart phone, the following obtains approximations of Chlorophyll a, Chlorophyll b, and carotenoids. Once such information is inferred from calculations, the display is altered to highlight such variables. The display screen is used as an auxiliary light source with known spectral qualities.

Using the selfie facing camera, and displaying a solid blue, green or red color using the display as a light source a method emerges to determine biologic values. For example, an image with and without blue being displayed can be subtracted and the blue reflection can be determined.

The approach includes the use of the cell phone screen to flash specific colors of light in multiple frames and then use subtractive image processing to calculate values.

The following is the methodology of using a sequence of display light conditions to determine plant characteristics. The specific formulas are approximations. Turning on a display solid color and turning it off also includes subtracting the values with image processing. The results are simultaneous equations that are solved with relative ratios.

The relative values are then translated into the resulting pictures using pseudo color, grey scale ranges or using the results to modify the original image by substituting one or more of the image color and grey value components.

To Measure Chlorophyll b

Measure the red channel with red display light. The small difference in the red channel with the red display on and not on is primarily related to chlorophyll b as there will be more red light emitted and red channel sensitivity in the lower 600 to 625 nm ranges.

To measure Chlorophyll a

Measure the green camera channel while turning emissions from blue display on and off, the difference is mostly attributable to the chlorophyll a level. Chlorophyll a will be approx. (0.8Cc+0.2Cb) (460 nm to 480 nm)

Measure the blue channel and turn on green display on and off. The increment will be mostly chlorophyll a with nearly equal shares of chlorophyll b and carotenoids from 500 to 550. (0.6Cb+0.4Cc) (500 nm to 550 nm) These two values will have a specific ratio that can be quantified as follows:

The disclosed system can also create a series of display screens with incremental ratios of blue light to green light. Over the course of multiple tests, when the delta in the subtractions is equal between the two tests (emit green and measure blue channel) and (emit blue and measure green channel). A relative value for each of Cc and Cb can be determined.

To measure and determine Carotenoids (Cc)

X=turning on and off the blue light˜(Ca+0.6Cb+0.4 Cc) while measuring the blue channel (440 nm to 480 nm)

Y=turning on and off the green light˜(Ca+Cb+0.6 Cc)) while measuring the green channel (500 to 550 nm)

Z=turning on and off the red light˜(Cb only) while measuring the red channel (only Cb is in the 600 to 625 range)

H=turning on and off the blue light while measuring green channel˜(0.8Cc+0.2Cb) (460 nm to 480 nm)

I=turning on and off the green light while measuring the blue channel (0.6Cb+0.4Cc) (500 nm to 550 nm)

J=Measure Red channel and turn on and off green light. This delta will measure 500 to 550 nm. This should also equal the results of 1, but with a different ratio of Cb to Cc due to the slope differences of the red and blue camera curves in this band.

This will enable a more accurate ratio of Cb and Cc to be determined with a specific value inferred because the light levels from the green display are fixed. Measurements I, J and Y all measure the same 500 to 550 nm range. This provides the ability to infer specific values to the ratios because the relative light levels between display r, display g and display b are known.

The disclosed system can also create a series of display screens with incremental ratios of blue light to green light. Over the course of multiple tests, when the delta in the subtractions is equal between the two tests (emit green and measure blue channel) and (emit blue and measure green channel). A relative value for each of Cc and Cb can be determined.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A system for capturing an image of an agricultural product and for producing an augmented display that depicts relative value measurements of the agricultural product, the augmented display presenting relative values of calculated biological characteristics, the system comprising:
   a) an image acquisition device comprising an image sensor connected to an image processor to acquire the image;
   b) the image processor configured to obtain, relative spectral data for two or more individual color channels obtained from the image;
   c) the image processor further configured to obtain one or more relative spectral properties of the agricultural product by only comparing relative color intensity ratios of the two or more color channels; and
   d) the image processor further configured to use the obtained relative spectral properties of the agricultural product to produce the augmented display, the augmented display showing characterization of biological characteristics.

2. The system of claim 1 wherein the image processor is further configured to obtain the relative spectral property of the product by use of a ratio.

3. The system of claim 1 wherein the image processor is configured to compare specific areas outlined by relative ratios,
   calculated
   as a function of time of exposure, or an amount of light reflected, or absorbed or fluoresced.

4. The system of claim 1 including light sources and filters synchronized to the image acquisition device.

5. The system of claim 1 further including a transmission of the image to a consumer or provider for quality assessment from a previously stored image or transmitted image.

6. The system of claim 1 wherein the image processor is further configured to use derivative formulas to enhance the relative spectral properties of the agricultural product.

* * * * *